United States Patent
Tsubota (10) Patent No.: US 9,300,529 B2
(45) Date of Patent: Mar. 29, 2016

(54) COMMUNICATION SYSTEM AND NETWORK RELAY DEVICE

(71) Applicant: Hitachi Metals, Ltd., Minato-ku, Tokyo (JP)

(72) Inventor: Shigeru Tsubota, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 77 days.

(21) Appl. No.: 14/139,111

(22) Filed: Dec. 23, 2013

(65) Prior Publication Data
US 2014/0204953 A1  Jul. 24, 2014

(30) Foreign Application Priority Data
Jan. 21, 2013 (JP) ................................. 2013-8010

(51) Int. Cl.
*H04L 12/937* (2013.01)
*H04L 12/24* (2006.01)
*H04L 12/931* (2013.01)
*H04L 12/939* (2013.01)
*H04L 12/933* (2013.01)

(52) U.S. Cl.
CPC .......... *H04L 41/0668* (2013.01); *H04L 49/253* (2013.01); *H04L 49/557* (2013.01); *H04L 49/65* (2013.01); *H04L 49/15* (2013.01)

(58) Field of Classification Search
CPC .................................................. H04L 49/253
See application file for complete search history.

(56) References Cited

U.S. PATENT DOCUMENTS

| | | | |
|---|---|---|---|
| 6,785,272 B1 | 8/2004 | Sugihara | |
| 2006/0041650 A1 | 2/2006 | Luo et al. | |
| 2007/0258359 A1 | 11/2007 | Ogasawara et al. | |
| 2008/0034112 A1* | 2/2008 | Imai et al. | ...... 709/238 |
| 2010/0011383 A1* | 1/2010 | Abdul Kader Jailani | ..... 719/330 |
| 2011/0305245 A1 | 12/2011 | Tanaka et al. | |
| 2013/0201875 A1* | 8/2013 | Anantharam et al. | ........ 370/255 |

(Continued)

FOREIGN PATENT DOCUMENTS

| | | |
|---|---|---|
| JP | 2002-217935 A | 8/2002 |
| JP | 2006-49963 A | 2/2006 |
| JP | 2006-509386 A | 3/2006 |
| JP | 2007-124673 A | 5/2007 |

(Continued)

OTHER PUBLICATIONS

Japanese Office Action issued in counterpart Japanese Application No. 2013-008010 dated Dec. 1, 2015 with English-language translation (seven (7) pages).

*Primary Examiner* — John Blanton
(74) *Attorney, Agent, or Firm* — Crowell & Moring LLP (57) ABSTRACT

A first switch device operating in a master mode, a second switch device operating in a backup mode, and third switch devices operating in a member mode in an initial state are provided. The first switch device operating in the master mode transmits a first control signal at every predetermined period to the second switch device operating in the backup mode. The second switch device operating in the backup mode makes a transition to the master mode when it does not receive for a predetermined period the first control signal from the first switch device operating in the master mode, and transmits an initializing signal to the third switch devices operating in the member mode. When having received the initializing signal, each of the third switch devices operating in the member mode constructs a management communication channel with the second switch device operating in the master mode.

9 Claims, 8 Drawing Sheets

(56) References Cited

U.S. PATENT DOCUMENTS

2013/0326099 A1* 12/2013 Schmidt et al. .............. 710/110
2014/0022937 A1* 1/2014 Kamble et al. .............. 370/254

FOREIGN PATENT DOCUMENTS

| | | |
|---|---|---|
| JP | 2011-259327 A | 12/2011 |
| JP | 2012-28998 A | 2/2012 |

* cited by examiner

MTBL

| SWID | OPERATION MODE | PORT NUMBER | OPERATION STATE | ... |
|------|----------------|-------------|-----------------|-----|
| ⋮ | ⋮ | ⋮ | ⋮ | ⋮ |
| ID2 | BUP | xx | ACTIVE | ... |
| ID3 | MEM | yy | ACTIVE | ... |
| ⋮ | ⋮ | ⋮ | ⋮ | ⋮ |
| IDn | MEM | zz | INACTIVE | ... |

COMMUNICATION SYSTEM AND NETWORK RELAY DEVICE

CROSS-REFERENCE TO RELATED APPLICATION

The present application claims priority from Japanese Patent Application No. 2013-008010 filed on Jan. 21, 2013, the content of which is hereby incorporated by reference into this application.

TECHNICAL FIELD OF THE INVENTION

The present invention relates to a communication system and a network relay device, and particularly relates to a technique for managing a plurality of network relay devices in a unified manner.

BACKGROUND OF THE INVENTION

For example, Japanese Patent Application Laid-Open Publication No. 2002-217935 (Patent Document 1) describes a method in which, in a stackable switching hub having a plurality of switching hubs connected via stack ports, a device ID number of each switching hub is set without having a management circuit mounted thereon. Japanese Patent Application Laid-Open Publication No. 2007-124673 (Patent Document 2) describes a method in which, in a stack type switching system in which a plurality of units operating as a master and slaves are connected via stack ports, a unit having the highest priority order is made to operate as a master on the occasion of the change of a topology design configuration.

SUMMARY OF THE INVENTION

In recent years, it is desired to realize a unified management function for managing a plurality of box type switch devices like one switch by one management IP (Internet Protocol) address. By providing this function, for example, it becomes possible to collectively display the operation state of the respective box type switch devices or collectively perform a predetermined setting (for example, setting of VLAN (Virtual Local Area Network)) for the respective box type switch devices in accordance with an instruction from a network administrator.

In order to realize the unified management function like this, usually, it is necessary to make any one of a plurality of box type switch devices operate as a master. Furthermore, it is needed to provide a backup function for the case where a fault occurs in the master. As this backup function, for example, a method in which a new master is selected from among a plurality of box type switch devices operating as slaves based on respective priority orders by using the method described in the Patent Document 2 may be adopted. However, when the method like this is used, since the process of comparing the priority orders with each other among slaves becomes necessary, there is a possibility that it takes time from the occurrence of a fault in a master until a communication management environment is constructed under a new master. More specifically, there is a possibility that fault tolerance may become insufficient.

The present invention has been made in view of such a matter, and one of the objects thereof is to provide a communication system and network relay device capable of realizing the improvement of the fault tolerance. The above and other objects and novel characteristics of the present invention will be apparent from the descriptions of the present specification and the accompanying drawings.

The following is a brief description of an outline of the typical embodiment of the invention disclosed in the present application.

A communication system of the present embodiment includes: a first switch device which operates in a master mode in an initial state; a second switch device which operates in a backup mode in an initial state; and one or more third switch devices each of which operates in a member mode in an initial state. The first switch device which operates in the master mode transmits a first control signal at every predetermined period to the second switch device which operates in the backup mode. The second switch device which operates in the backup mode makes a transition to the master mode when it does not receive for a predetermined period the first control signal from the first switch device which operates in the master mode, and transmits an initializing signal to the one or more third switch devices which operate in the member mode. When each of the one or more third switch devices which operates in the member mode has received the initializing signal, it constructs a management communication channel with the second switch device which operates in the master mode.

The effects obtained by a typical embodiment of the invention disclosed in the present application will be briefly described below. That is, it becomes possible to improve the fault tolerance.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted.

<<Schematic Configuration of Whole Communication System>>

Figure 1:
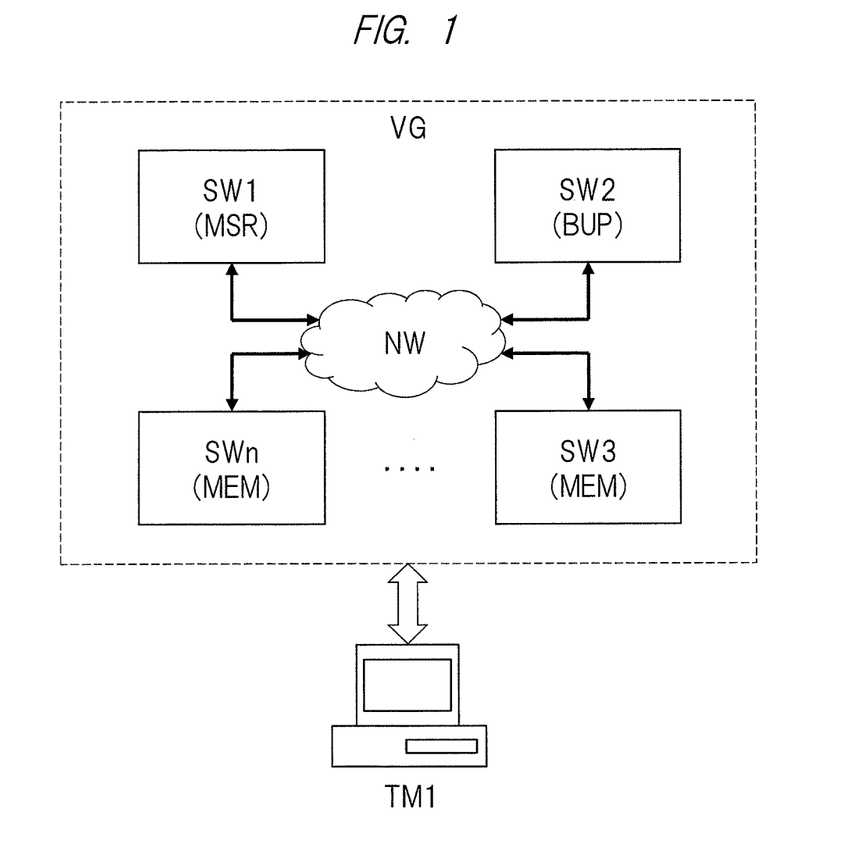
FIG. 1 is a schematic diagram showing a configuration example of a whole communication system according to an embodiment of the present invention.

FIG. 1 is a schematic diagram showing a configuration example of a whole communication system according to an embodiment of the present invention. The communication system shown in FIG. 1 is provided with a plurality of (here, n) switch devices (referred to also as network relay device) SW1 to SWn which are connected via a network NW. Each of SW1 to SWn is composed of a box type switch device. The network NW is constituted mainly by a communication channel, and a connection configuration thereof is not particularly limited. NW may have a connection configuration in which SW1 to SWn are connected in a ring-like shape or a connection configuration in which SW1 to SWn are connected in a mesh-like shape. In addition, depending on the situation, NW may have a connection configuration in which SW1 to SWn are connected via an optical transmission device or the like in a long distance. More specifically, any network can be used as the network NW as long as the network has a communication channel among SW1 to SWn in a direct configuration or an indirect configuration including a switch device, an optical transmission device and the like.

The switch devices SW1 to SWn shown in FIG. 1 are virtually managed like one unit of switch as a virtual management group VG by a management terminal TM1. Although not limited in particular, for example, it is possible to collectively display an operation state of each of SW1 to SWn (and each port thereof) in TM1 and collectively perform a predetermined setting (for example, setting of VLAN or the like) to SW1 to SWn in accordance with a management instruction from TM1 to VG. Each of SW1 to SWn has various functions required for realizing a unified management like this in addition to a function as a common L3 switch (or L2 switch).

As one of the unified management functions, each of the switch devices SW1 to SWn shown in FIG. 1 has a function to operate in any one of a master mode MSR, a backup mode BUP and a member mode MEM. Here, SW1 which is to be a first switch device operates in MSR, SW2 which is to be a second switch device operates in BUP, and each of SW3 to SWn which is to be one or more third switch devices operate in MEM. The switch device SW1 which operates in MSR manages the switch device SW2 which operates in BUP and each of the switch devices SW3 to SWn which operates in MEM. For example, when a management instruction is issued from the management terminal TM1 to a predetermined IP address set to the virtual management group VG, the switch device which operates in MSR deciphers the management instruction and suitably communicates with each of the switch devices which operates in BUP and MEM, thereby performing the process in accordance with the management instruction.

When any fault occurs in the switch device SW1 which operates in the master mode MSR, the switch device SW2 which operates in the backup mode BUP operates in MSR in place of SW1, and manages each of the switch devices SW3 to SWn which operates in the member mode MEM. Each of the switch devices SW3 to SWn which operates in MEM mainly receives an instruction from the switch device which operates in MSR, deciphers this instruction, and performs the process in accordance with this instruction.

Here, which of the master mode MSR, the backup mode BUP and the member mode MEM in which each of the switch devices SW1 to SWn shown in FIG. 1 operates is determined in advance by the setting of a user in the initial state (in other words, at the time of a start up of the communication system). Accordingly, when a fault occurs in the switch device (first switch device) SW1 which operates in MSR in the initial state, it is possible to determine the switch device which newly operates in MSR (the second switch device SW2 which operates in BUP in the initial state) without using the process of priority order described in the Patent Document 2 mentioned above. As a result, it becomes possible to promptly cope with the fault and achieve the improvement in fault tolerance.

<<Operation of Whole Communication System in Initial Period>>

Figure 2:
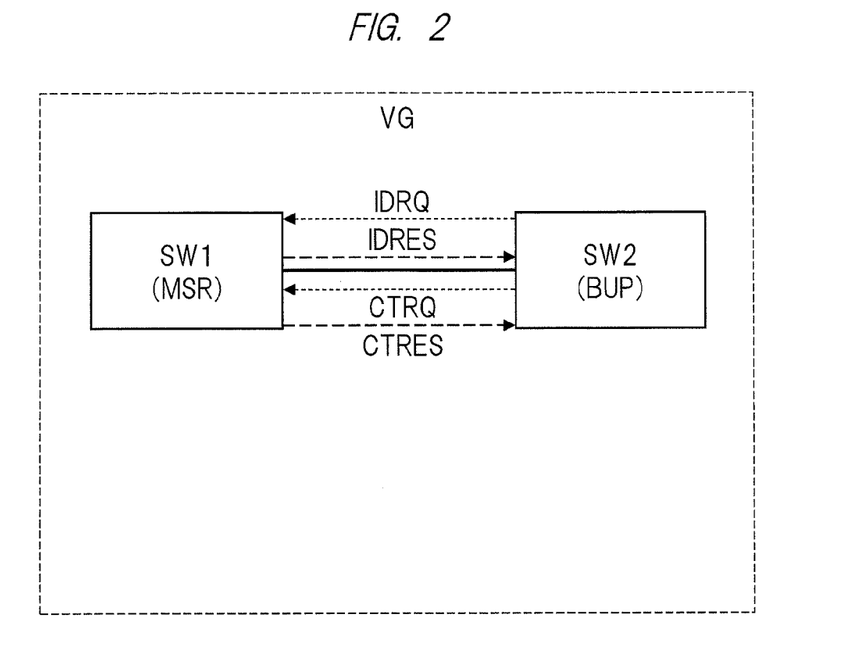
FIG. 2 is a diagram showing an example of process contents in an initial period for constructing a communication management environment in the communication system in FIG. 1.
Figure 3:
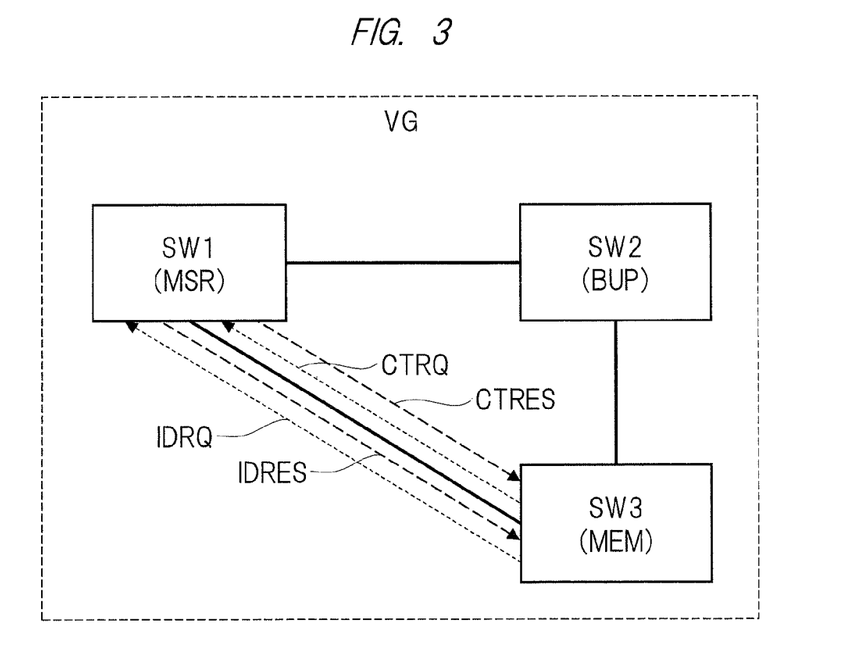
FIG. 3 is a diagram showing an example of process contents in an initial period for constructing a communication management environment in the communication system in FIG. 1.

FIGS. 2 and 3 are diagrams showing an example of process contents in an initial period for constructing a communication management environment in the communication system in FIG. 1. First, as a premise, the switch device SW1 which operates in the master mode MSR in the communication system shown in FIG. 1 shall manage each of switch devices SW2 to SWn which operates in the backup mode BUP and the member mode MEM based on an identifier SWID. Consequently, each of SW2 to SWn which operates in the BUP and the MEM needs to make the switch device SW1 operating in the MSR recognize their own identifiers SWID. In addition, thereafter, each of SW2 to SWn needs to construct a management communication channel with SW1.

Furthermore, as a premise, the management communication in the virtual management group VG shown in FIG. 1 shall be performed by using TCP (Transmission Control Protocol)/IP protocol (in other words, socket communication). IP addresses of the switch devices SW2 to SWn which operate in the backup mode BUP and the member mode MEM are unknown in the first communication with the switch device SW1 which operates in the master mode MSR. Thus, for example, a temporary IP address is set to SW2 to SWn commonly in advance, and then, a connection IP address is individually set to each of SW2 to SWn in the process of the communication between each of SW2 to SWn and SW1 and the temporary IP address is replaced with the connection IP address. SW1 which operates in MSR uses this connection IP address when actually managing SW2 to SWn which operate in BUP and MEM.

On the basis of the premise described above, in FIG. 2, the switch device (second switch device) SW2 which operates in the backup mode BUP in the initial state first transmits an identifier acquisition request IDRQ to the switch device (first switch device) SW1 which operates in the master mode MSR in the initial state by using the temporary IP address. In response to this, SW1 returns an identifier acquisition notification IDRES when assigning the identifier SWID to SW2. When SW2 has received IDRES, SW2 subsequently establishes TCP connection with SW1 based on a handshake including transmission of a connection request CTRQ to SW1 and a connection response CTRES from SW1. The connection IP address of SW2 is set in this TCP connection, and the temporary IP address is replaced with the connection IP address. In this manner, one of the switch device SW2 which is to be a second switch device and the switch device SW1 which is to be a first switch device constructs the management communication channel with the other.

Similarly, in FIG. 3, the switch device (third switch device) SW3 which operates in the member mode MEM in the initial state transmits the identifier acquisition request IDRQ to the switch device (first switch device) SW1 which operates in the master mode MSR in the initial state by using the temporary IP address. In response to this, SW1 returns the identifier acquisition notification IDRES when assigning the identifier SWID to SW3. When SW3 has received IDRES, SW3 subsequently establishes the TCP connection with SW1 based on a handshake including transmission of the connection request CTRQ to SW1 and the connection response CTRES from SW1. The connection IP address of SW3 is set in this TCP connection, and the temporary IP address is replaced with the connection IP address.

In this manner, one of SW3 which is to be one of the third switch devices and SW1 which is to be a first switch device constructs the management communication channel with the other. Although not shown, the switch device SWn which is to be one of other third switch devices in FIG. 1 also constructs the management communication channel mutually with SW1 which operates in the master mode MSR through the same process as the case of FIG. 3.

As described above, which of the master mode MSR, the backup mode BUP and the member mode MEM in which each of the switch devices SW1 to SWn operates is determined in advance by the setting of a user in the initial state. Though not particularly limited, in addition to this, the identifier SWID in the initial state, a port number used as a management port and others are also set in advance by the setting of a user.

For example, to the switch device SW2 which operates in the backup mode BUP in the initial state, the operation mode=BUP, the identifier SWID=ID2 and the port number=xx are set in advance by the setting of a user. When the communication system is started in this state, SW2 transmits a request for permission to use ID2 to the switch device SW1 in the identifier acquisition request IDRQ shown in FIG. 2, and SW1 which has received it returns the identifier acquisition notification IDRES to SW2 when switch devices using ID2 do not exist. On the other hand, when the switch device using ID2 has already existed, SW1 makes the user recognize that. In this case, the user will set SWID of SW2 in the initial state again.

The process contents of FIGS. 2 and 3 are not limited to these in particular, and can be appropriately changed. More specifically, any process contents can be adopted as long as the communication environment in which the switch device operating in the master mode MSR can distinctively manage each of switch devices operating in the backup mode BUP and the member mode MEM and can individually communicate with the respective switch devices can be constructed.

<<Operation of Whole Communication System in Normal Period>>

Figure 4:
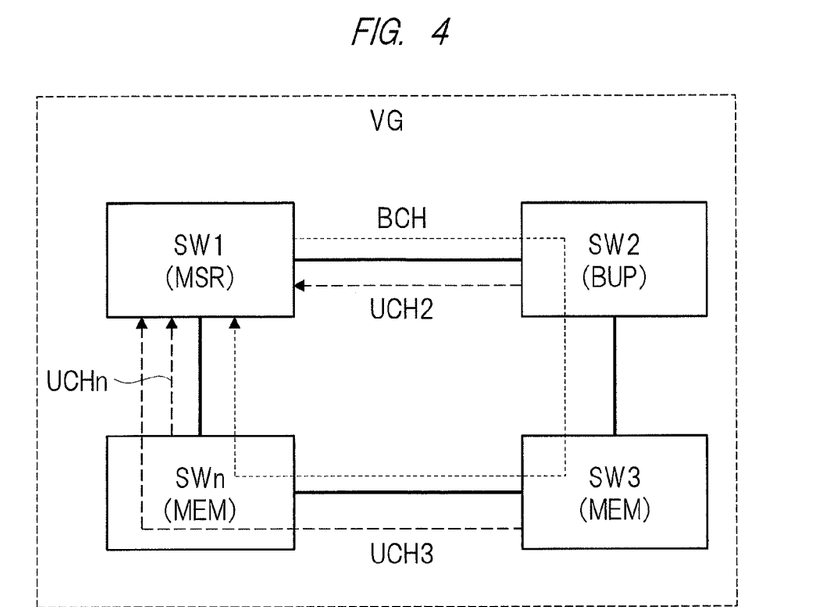
FIG. 4 is a diagram showing an example of process contents in a normal period after having constructed the communication management environment in the communication system in FIG. 1.

FIG. 4 is a diagram showing an example of process contents in a normal period after having constructed the communication management environment in the communication system in FIG. 1. In FIG. 4, the switch device (first switch device) SW1 which operates in the master mode MSR transmits a hello packet (first control signal) BCH to the switch device (second switch device) SW2 which operates in the backup mode BUP and the switch devices (one or more third switch devices) SW3 to SWn which operate in the member mode MEM. Specifically, SW1 transmits BCH by broadcast at every predetermined period (for example, at every one second).

On the other hand, the switch device (second switch device) SW2 which operates in the backup mode BUP and the switch devices (one or more third switch devices) SW3 to SWn which operate in the member mode MEM transmit hello packets (second control signal) UCH2 to UCHn to the switch device (first switch device) SW1 which operates in the master mode MSR, respectively. Specifically, SW2 to SWn transmit UCH2 to UCHn by unicast to SW1 at every predetermined period (for example, at every one second), respectively. SW1 manages the operation states of SW2 to SWn (that is, existence or non-existence of a fault) based on the receipt or non-receipt of UCH2 to UCHn. On the contrary, SW2 to SWn recognize the operation state of SW1 (that is, existence or non-existence of a fault) based on the receipt or non-receipt of the hello packet (first control signal) BCH.

Here, the switch device SW1 which operates in the master mode MSR transmits the hello packet (first control signal) BCH by broadcast to the switch devices SW2 to SWn which operate in the backup mode BUP and the member mode MEM. However, when only the case where the switch device operating in BUP is made to newly operate in MSR in response to the occurrence of a fault in the switch device operating in MSR is taken into consideration, it is only necessary that SW2 operating in BUP can recognize at least the operation state of SW1. More specifically, depending on the situation, an operation in which SW1 transmits BCH by unicast to SW2 may be carried out.

Here, in order to guarantee that a bidirectional communication has been established each between the switch device SW1 which operates in the master mode MSR and the switch devices SW3 to SWn which operate in the member mode MEM, SW1 transmits the hello packet (first control signal) BCH by broadcast also to SW3 to SWn in addition to SW2. In this manner, it is guaranteed that SW1 is in a state of being able to reliably manage SW3 to SWn via a predetermined management request.

<<Operation of Whole Communication System at Time of Occurrence of Master Fault>>

Figure 5:
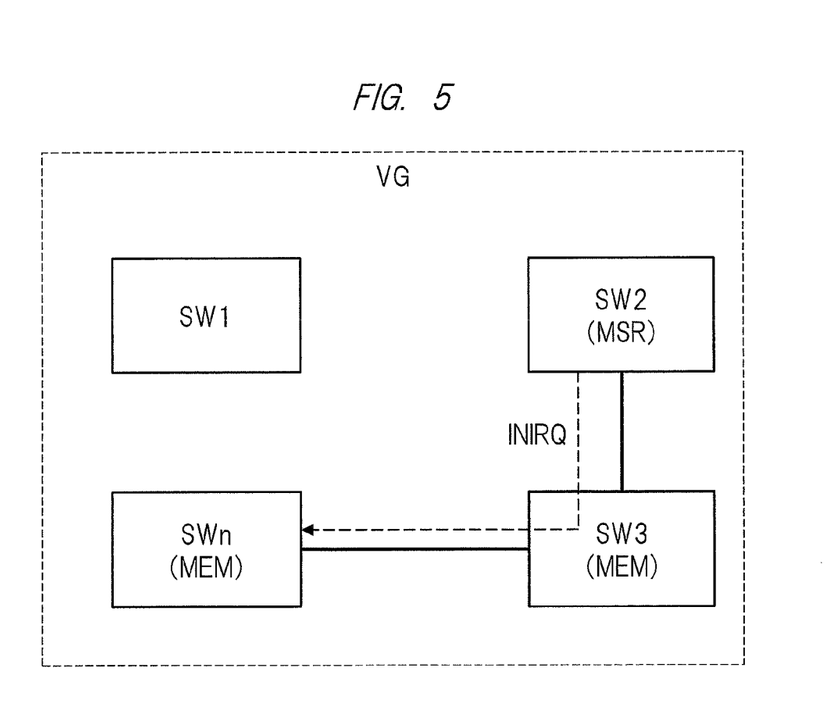
FIG. 5 is a diagram showing an example of process contents when a fault occurs in a switch device which operates in a master mode in the communication system in FIG. 1.
Figure 6:
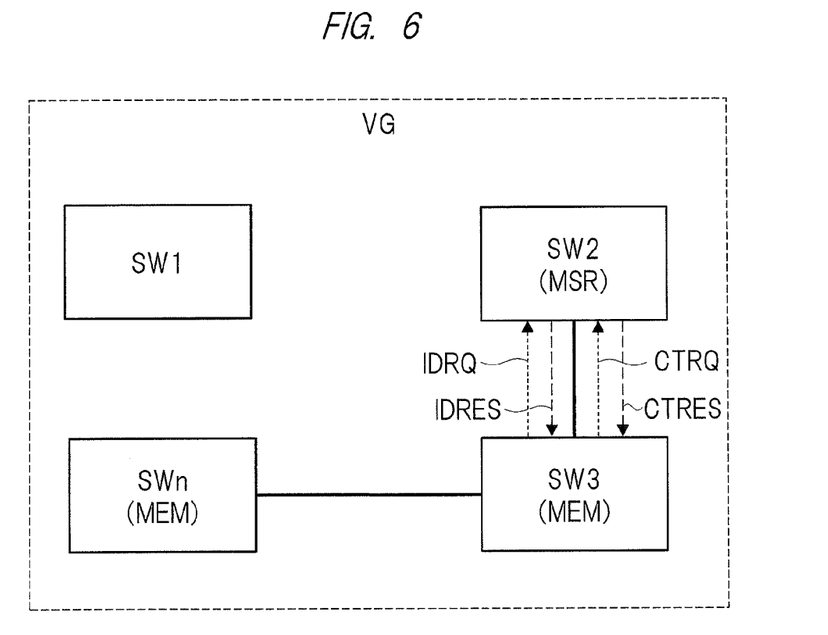
FIG. 6 is a diagram showing an example of process contents when a fault occurs in a switch device which operates in a master mode in the communication system in FIG. 1.
Figure 7:
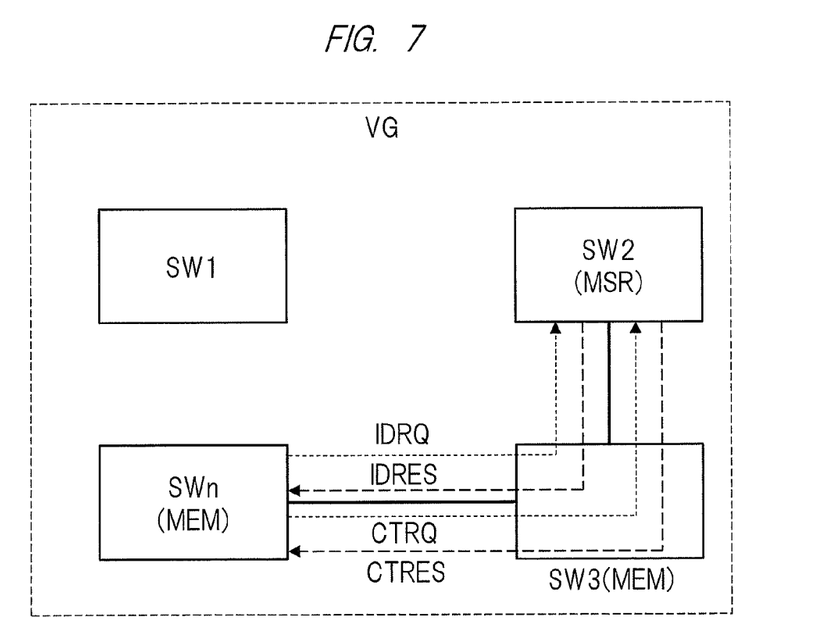
FIG. 7 is a diagram showing an example of process contents when a fault occurs in a switch device which operates in a master mode in the communication system in FIG. 1.

FIGS. 5 to 7 are diagrams showing an example of process contents when a fault occurs in the switch device which operates in the master mode in the communication system in FIG. 1. In FIG. 4 mentioned above, the switch device (second switch device) SW2 which operates in the backup mode BUP makes a transition to MSR in place of SW1 when SW2 does not receive the hello packet (first control signal) BCH from the switch device (first switch device) SW1 which operates in the master mode MSR for a predetermined period (for example, about 15 seconds). SW2 which has made a transition to MSR first transmits an initializing signal INIRQ to the switch devices (one or more third switch devices) SW3 to SWn which operate in the member mode MEM as shown in FIG. 5. Specifically, SW2 transmits INIRQ by, for example, broadcast.

When the switch device SW3 which operates in the member mode MEM has received the initializing signal INIRQ, it performs the process shown in FIG. 6 with a transmission source of the INIRQ serving as a communication partner. Process contents shown in FIG. 6 are the same as the process contents of FIG. 3 mentioned above except that the communication partner of SW3 is replaced with the switch device SW2 which has made a transition from the backup mode BUP to the master mode MSR. When described briefly, in FIG. 6, SW3 first transmits the identifier acquisition request IDRQ to SW2 by using a temporary IP address, and receives the identifier acquisition notification IDRES from SW2. In this manner, it becomes possible that SW2 which operates in MSR manages SW3 which operates in MEM by using an identifier SWDID.

Subsequently, the switch device SW3 establishes the TCP connection with SW2 based on a handshake including the connection request CTRQ and the connection response CTRES with the switch device SW2. The connection IP address of SW3 is set in this TCP connection, and the temporary IP address is replaced with the connection IP address. In this manner, one of SW3 which is to be one of the third switch devices and SW2 which is to be the second switch device constructs the management communication channel with the other. Similarly, the switch device SWn which operates in the member mode MEM also performs the process shown in FIG. 7 with the transmission source of the INIRQ serving as a communication partner when it has received the initializing signal INIRQ. In FIG. 7, in the same manner as the case shown in FIG. 6, process of the identifier acquisition request IDRQ and the identifier acquisition notification IDRES and the process of handshake including the connection request CTRQ and the connection response CTRES are performed between SWn and SW2 via SW3 in this case. In this manner, one of SWn which is to be one of the other third switch devices and SW2 which is to be the second switch device constructs the management communication channel with the other.

Note that, in FIG. 4 mentioned above, the switch device (first switch device) SW1 transmits the hello packet (first control signal) BCH also to the switch devices (one or more third switch devices) SW3 to SWn which operate in the member mode MEM. Each of SW3 to SWn makes a transition to the initial state before constructing the management communication channel when it does not receive BCH from SW1 for a predetermined period. Then, SW3 to SWn which have made a transition to the initial state search a new switch device which operates in the master mode MSR. As described above, by using the transition of SW3 to SWn to the initial state and the initializing signal INIRQ from the switch device SW2 which newly operates in the MSR as shown in FIG. 5 in combination, each of SW3 to SWn can recognize that there is an agreement between itself and SW2 regarding the fact that there is a fault in SW1. In this manner, validity of newly changing the switch device which operates in the MSR itself can be verified, and it becomes possible to further enhance the reliability.

<<Configuration of Switch Device (Network Relay Device)>>

Figure 8:
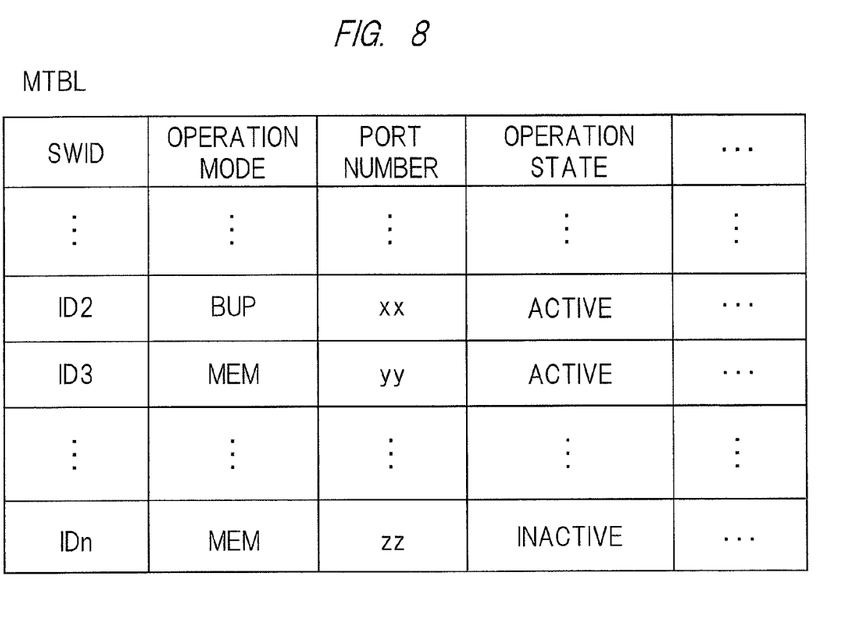
FIG. 8 is a diagram showing a configuration example of a management table provided in the switch device operating in the master mode in the communication system in FIG. 1.

FIG. 8 is a diagram showing a configuration example of a management table provided in the switch device operating in the master mode MSR in the communication system in FIG. 1. As described in FIGS. 2 and 3, the switch device (network relay device) which operates in MSR manages each of switch devices (network relay device) which operates in the backup mode BUP and the member mode MEM by the identifier SWID. Thus, for example, the switch device which operates in MSR generates a management table MTBL as shown in FIG. 8. In MTBL in FIG. 8, an operation mode, a port number, an operation state and the like are shown for each identifier SWID as management information. The management information is not limited to these, and items needed for management other than these are included suitably.

For example, in the management information of the switch device (SW2 in FIG. 1) whose identifier SWID is "ID2", the operation mode is the backup mode BUP, a destination port for performing management communication with SW2 is indicated in the port number, and the operation state is "ACTIVE". Also, when SWID of the switch device SWn in FIG. 1 is assumed to be "IDn" and a fault occurs in SWn, the operation state corresponding to "IDn" becomes "INACTIVE" as shown in FIG. 8. For example, this situation arises when the switch device SW1 cannot receive the hello packet (second control signal) UCHn from SWn for a predetermined period in FIG. 4.

Figure 9:
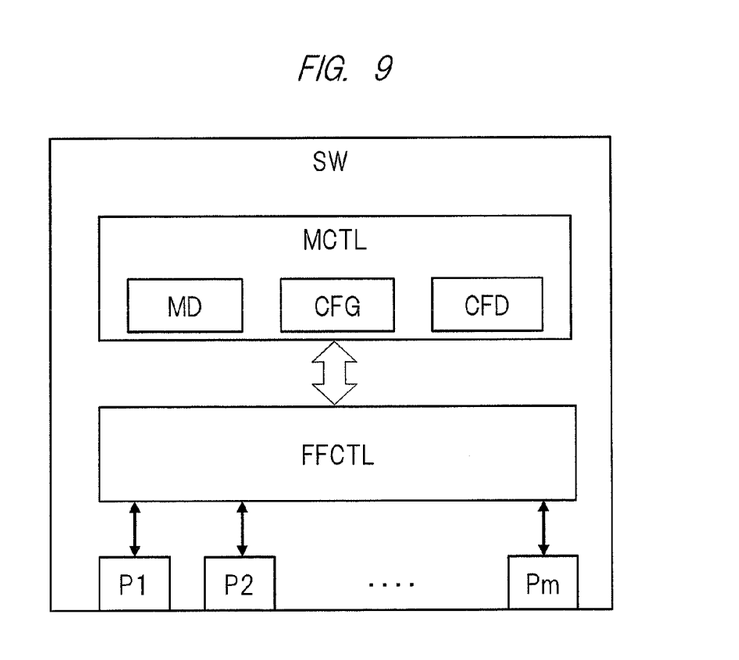
FIG. 9 is a block diagram showing a schematic configuration example of a main part of each switch device of the communication system in FIG. 1.

FIG. 9 is a block diagram showing a schematic configuration example of a main part of each switch device of the communication system in FIG. 1. A switch device (network relay device) SW shown in FIG. 9 is provided with a plurality of (here, m) ports P1 to Pm, a packet (frame) transfer control unit FFCTL and a management control unit MCTL. Each of P1 to Pm is composed of a general port through which a data packet of a user is transmitted or received based on a standardized communication protocol of an L3 level (or L2 level). FFCTL controls the transfer of a packet (frame) among P1 to Pm based on a routing table, a MAC (Media Access Control) address table and the like.

The management control unit MCTL includes an operation mode retaining unit MD, a control packet (frame) generation unit CFG and a control packet (frame) detection unit CFD. In the operation mode retaining unit MD, any one of the master mode MSR, the backup mode BUP and the member mode MEM mentioned above is retained. MCTL performs respectively different operations in accordance with the operation mode retained by this MD. CFG generates the hello packets BCH and UCH shown in FIG. 4, the initializing signal INIRQ shown in FIG. 5 and others in accordance with the operation mode. CFD also detects BCH, UCH, INIRQ and others in accordance with the operation mode.

Here, it is possible to select the management port optionally from among the ports P1 to Pm which are the general ports based on the setting of a user. Then, by executing the process as described in FIGS. 2 and 3 by using the general ports, the management communication channel is constructed. Usually, as the management port for realizing the unified management, a stack port which is to be a dedicated port is used as described in the Patent Document 1 and the Patent Document 2 mentioned above. In this case, however, there is a possibility that a connection configuration between switch devices is limited and a distance to connect the respective switch devices is limited. When the general port is used, such problems can be solved, and it becomes possible to manage the communication system having various connection configurations in a unified manner.

<<Operation of Switch Device (Network Relay Device)>>

Figure 10:
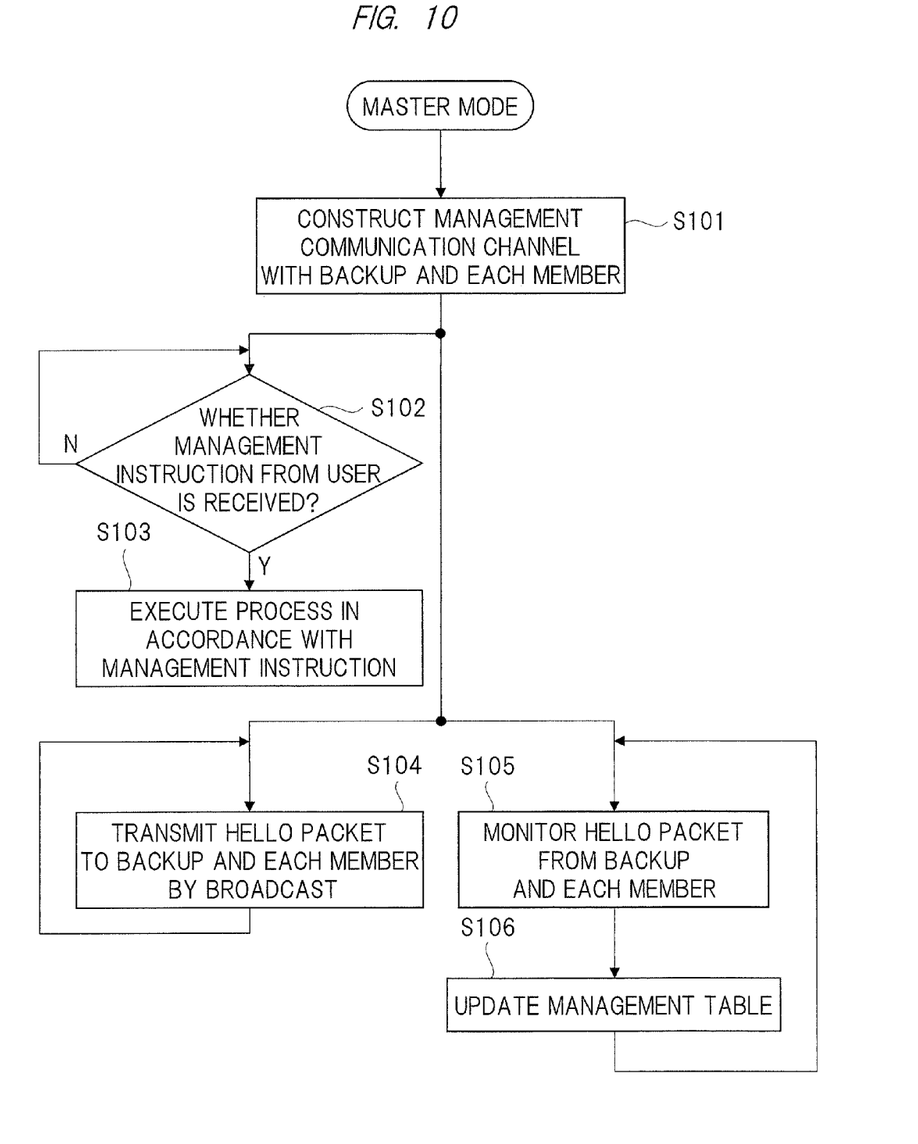
FIG. 10 is a flow chart showing an example of main process contents in the master mode in the switch device in FIG. 9.

FIG. 10 is a flow chart showing an example of main process contents in the master mode MSR in the switch device in FIG. 9. In FIG. 10, the switch device (network relay device) SW first constructs the management communication channel with each of switch devices (network relay device) which operates in the backup mode BUP and the member mode MEM as shown in FIGS. 2 and 3 (Step S101). Specifically, based on a predetermined initial setting algorithm provided in the management control unit MCTL in FIG. 9, the processes as shown in FIGS. 2 and 3 are sequentially executed.

Subsequently, the switch device SW waits for the management instruction from the user (that is, the management terminal TM1 in FIG. 1) (Step S102), and when receiving the management instruction, the switch device SW executes the processes in accordance with the management instruction (Step S103). Specifically, the management control unit MCTL in FIG. 9 deciphers the management instruction received via the packet (frame) transfer control unit FFCTL, and performs communication and others suitably with each of switch devices which operates in the backup mode BUP and the member mode MEM in accordance with the deciphered result.

Further, the switch device SW performs a process of Step S104 and a process of Step S105 in parallel to the process of Step S102. In Step S104, SW transmits the hello packet (first control signal) BCH at every predetermined period to each of switch devices which operates in the backup mode BUP and the member mode MEM as shown in FIG. 4. Specifically, the control packet (frame) generation unit CFG in FIG. 9 generates BCH for broadcast, and transmits it from a predetermined management port via the packet (frame) transfer control unit FFCTL. BCH is transmitted in a network constituted of management ports of each switch device, and reaches each switch device which operates in BUP and MEM.

In Step S105, the switch device SW monitors each hello packet (second control signal) UCH transmitted at every predetermined period from each switch device which operates in the backup mode BUP and the member mode MEM as shown in FIG. 4. Then, SW updates suitably the management table MTBL in FIG. 8 in accordance with the monitor results (Step S106). Specifically, the control packet (frame) detection unit CFD in FIG. 9 monitors the receipt or non-receipt of each UCH via the packet (frame) transfer control unit FFCTL. Then, when there is UCH which cannot be received for a predetermined period, CFD changes an operation state of the switch device corresponding to the UCH to "INACTIVE" in MTBL retained in the management control unit MCTL.

Figure 11:
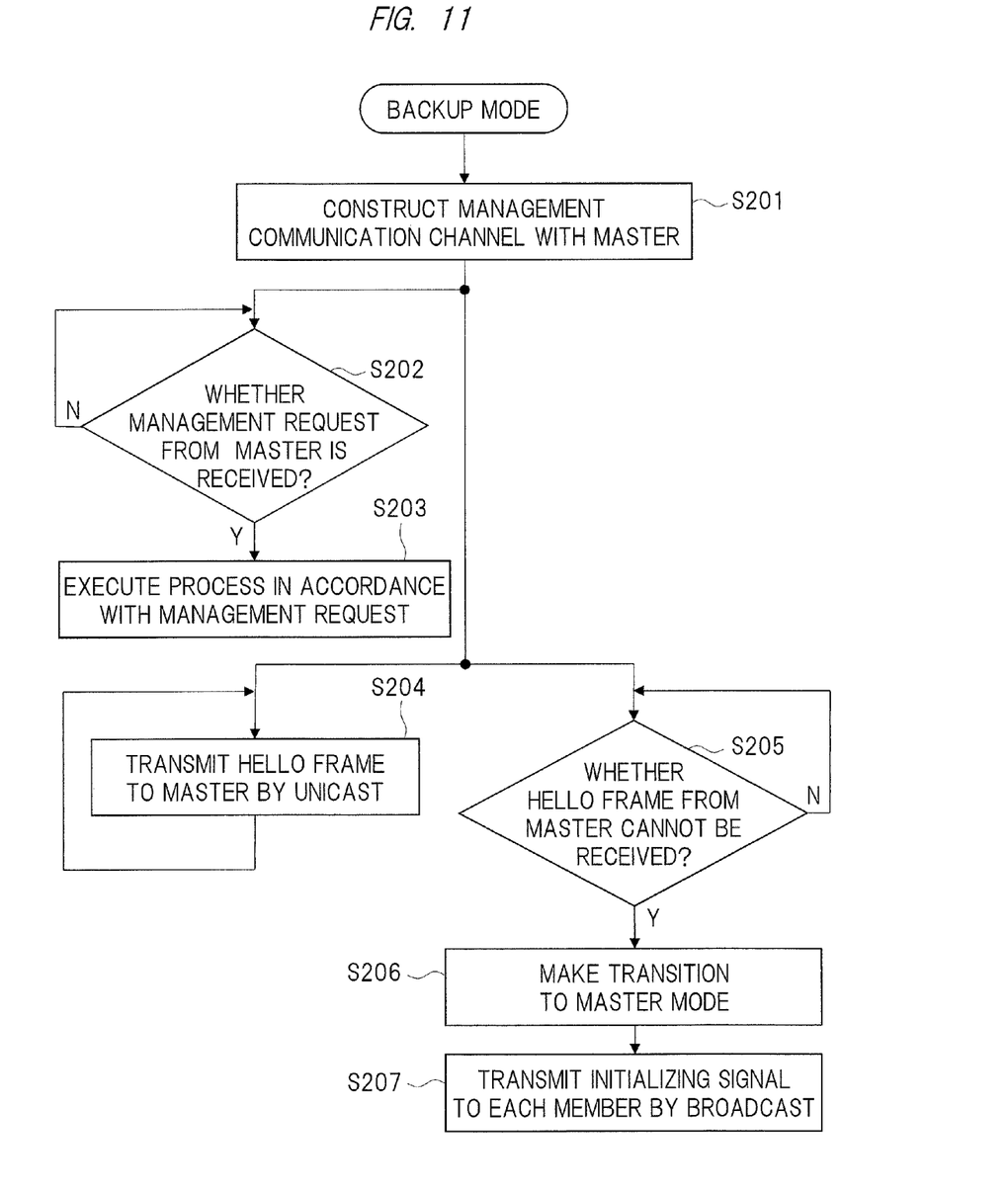
FIG. 11 is a flow chart showing an example of main process contents in a backup mode in the switch device in FIG. 9.

FIG. 11 is a flow chart showing an example of main process contents in the backup mode BUP in the switch device in FIG. 9. In FIG. 11, the switch device (network relay device) SW first constructs the management communication channel with the switch device (network relay device) which operates in the master mode MSR as shown in FIG. 2 (Step S201). Specifically, based on the predetermined initial setting algorithm provided in the management control unit MCTL shown in FIG. 9, the processes as shown in FIG. 2 are sequentially executed.

Subsequently, the switch device SW waits for a management request from the switch device which operates in the master mode MSR (Step S202), and when it has received the management request, it executes processes in accordance with the management request (Step S203). Specifically, the management control unit MCTL shown in FIG. 9 deciphers the management request received via the packet (frame) transfer control unit FFCTL and performs processes in accordance with the deciphered result, for example, suitably performs a reply or the like to the switch device which operates in the MSR.

In addition, the switch device SW performs a process of Step S204 and a process of Step S205 in parallel to the process of Step S202. In Step S204, SW transmits the hello packet (second control signal) UCH at every predetermined period to the switch device which operates in the master mode MSR as shown in FIG. 4. Specifically, the control packet (frame) generation unit CFG shown in FIG. 9 generates UCH for unicast, and transmits it from the predetermined management port via the packet (frame) transfer control unit FFCTL.

In Step S205, the switch device SW monitors the hello packet (first control signal) BCH from the switch device which operates in the master mode MSR, and it makes a transition to MSR (Step S206) when it cannot receive the hello packet BCH for a predetermined period (Step S205) as shown in FIG. 4. Specifically, the control packet (frame) detection unit CFD shown in FIG. 9 monitors the receipt or non-receipt of BCH via the packet (frame) transfer control unit FFCTL, and when it cannot receive the BCH for a predetermined period, it changes the operation mode of the operation mode retaining unit MD to MSR.

Subsequently, the switch device SW which has made a transition to the master mode MSR transmits the initializing signal INIRQ by broadcast (Step S207) to each switch device which operates in the member mode MEM as shown in FIG. 5. Specifically, the control packet (frame) generation unit CFG shown in FIG. 9 generates INIRQ for broadcast, and transmits it from the predetermined management port via the packet (frame) transfer control unit FFCTL. INIRQ is transmitted in a network constituted of management ports of each switch device, and reaches each switch device which operates in MEM. Note that the switch device which has made a transition to the master mode MSR thereafter performs processes shown in FIG. 10 mentioned above.

Figure 12:
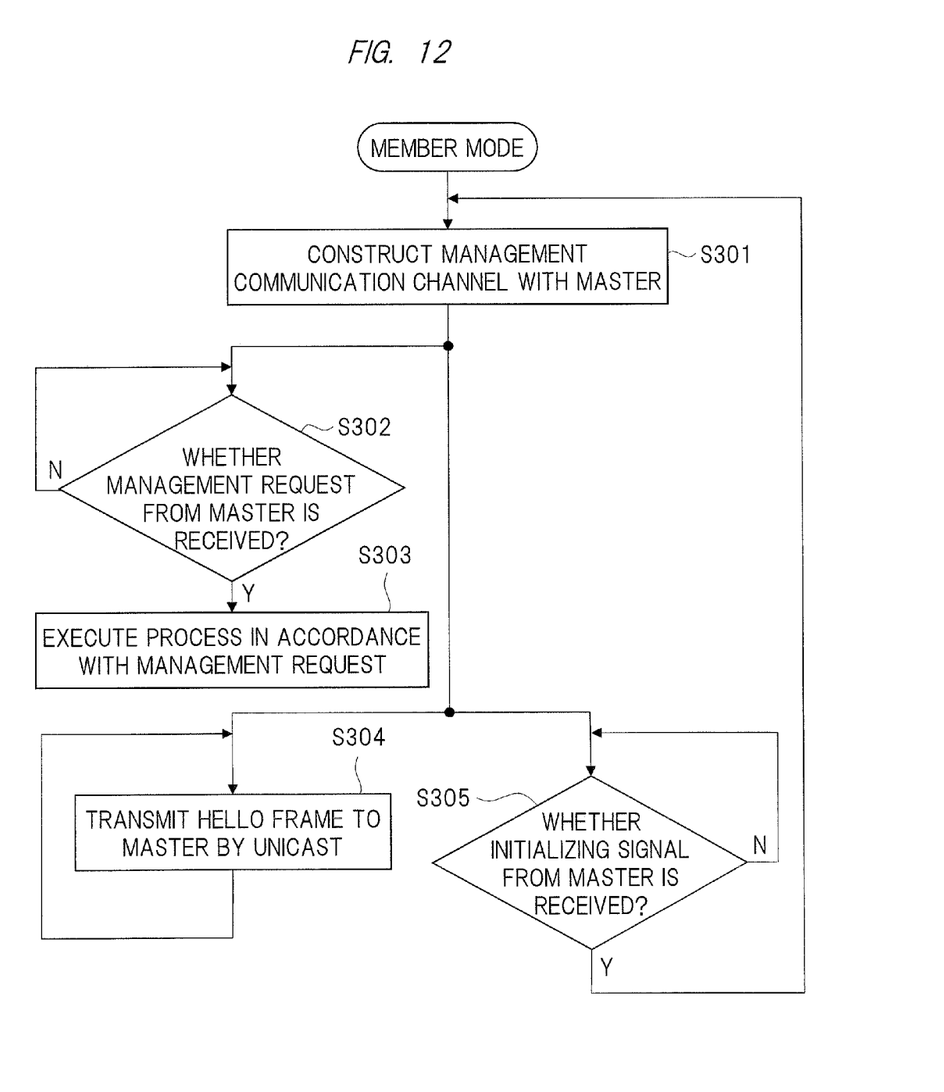
FIG. 12 is a flow chart showing an example of main process contents in a member mode in the switch device in FIG. 9.

FIG. 12 is a flow chart showing an example of main process contents in the member mode MEM in the switch device in FIG. 9. In FIG. 12, the switch device (network relay device) SW first constructs the management communication channel with the switch device (network relay device) which operates in the master mode MSR as shown in FIG. 3 (Step S301). Specifically, the processes as shown in FIG. 3 are sequentially executed based on the predetermined initial setting algorithm provided in the management control unit MCTL shown in FIG. 9.

Subsequently, the switch device SW waits for a management request from the switch device which operates in the master mode MSR (Step S302), and when it has received the management request, it executes processes in accordance with the management request (Step S303). Specifically, the management control unit MCTL shown in FIG. 9 deciphers the management request received via the packet (frame) transfer control unit FFCTL, performs processes in accordance with the deciphered result, and suitably performs a reply or the like to the switch device which operates in the MSR.

In addition, the switch device SW performs a process of Step S304 and a process of Step S305 in parallel to the process of Step S302. In Step S304, SW transmits the hello packet (second control signal) UCH at every predetermined period to the switch device which operates in the master mode MSR as shown in FIG. 4. Specifically, the control packet (frame) generation unit CFG shown in FIG. 9 generates UCH for unicast and transmits it from the predetermined management port via the packet (frame) transfer control unit FFCTL.

In Step S305, the switch device SW monitors the initializing signal INIRQ from the switch device which has made a transition to the master mode MSR as shown in FIG. 5. Specifically, the control packet (frame) detection unit CFD shown in FIG. 9 monitors existence or non-existence of receipt of INIRQ via the packet (frame) transfer control unit FFCTL. Then, SW returns to Step S301 when receiving INIRQ, and constructs the management communication channel with the switch device which has made a transition to MSR as shown in FIGS. 6 and 7.

In the foregoing, the invention made by the inventor of the present invention has been concretely described based on the embodiments. However, it is needless to say that the present invention is not limited to the foregoing embodiments and various modifications and alterations can be made within the scope of the present invention. For example, embodiments mentioned above are described in detail for making the present invention easily understood, and are not necessarily limited to those provided with all the described configurations. In addition, it is possible to replace a part of the configuration of an embodiment with a configuration of another embodiment, and it is also possible to add a configuration of an embodiment to a configuration of another embodiment. Furthermore, it is also possible to make addition, deletion and replacement of a configuration with respect to a part of configurations of each embodiment.

For example, the case where one switch device which operates in the back mode BUP is determined by the setting of a user in advance to cope with a single fault has been described here as an example. In this case, for example, after a fault occurs in the switch device which operates in the master mode MSR in an initial state and the fault has been restored, this switch device may be made to operate in MSR again, and the switch device which operates in BUP in an initial state and has made a transition to MSR may be returned to BUP again. However, when higher system reliability is needed, it is also possible to determine the switch device which operates in second BUP by the setting of a user in advance based on the assumption that a fault may occur in both of the switch device which operates in MSR in an initial state and the switch device which operates in BUP in an initial state (that is, double fault). In this case, the switch device which operates in second BUP makes a transition to MSR when it cannot receive the hello frame (BCH in FIG. 4) which is to be transmitted from the switch device which operates currently in MSR (SW1 in FIG. 4 or SW2 in FIG. 5).

What is claimed is:

1. A communication system, comprising:
    a first switch device which operates in a master mode in an initial state;
    a second switch device which operates in a backup mode in an initial state; and
    one or more third switch devices each of which operates in a member mode in an initial state,
    wherein the first switch device which operates in the master mode transmits a first control signal at every predetermined period to the second switch device which operates in the backup mode,
    the second switch device which operates in the backup mode makes a transition to the master mode when it does not receive for a predetermined period the first control signal from the first switch device which operates in the master mode, and transmits an initializing signal to the one or more third switch devices which operate in the member mode, and
    when each of the one or more third switch devices which operates in the member mode has received the initializing signal, that one of the one or more third switch devices constructs a management communication channel with the second switch device which operates in the master mode.

2. The communication system according to claim 1, wherein
    each of the switch device which operates in the backup mode and the switch device which operates in the member mode transmits a second control signal at every predetermined period to the switch device which operates in the master mode, and
    the switch device which operates in the master mode manages respective operation states of the switch device which operates in the backup mode and the switch device which operates in the member mode based on receipt or non-receipt of the second control signal.

3. The communication system according to claim 2, wherein
    the first switch device further transmits the first control signal to the one or more third switch devices, and
    when each of the one or more third switch devices does not receive the first control signal for a predetermined period, it makes a transition to an initial state before the management communication channel is constructed.

4. The communication system according to claim 2, wherein
    the management communication channel is constructed of a general port which transmits or receives a data packet of a user based on a standardized communication protocol.

5. The communication system according to claim 4, wherein
    each of the first to third switch devices is constituted of a box type switch device.

6. A network relay device, comprising: a master mode; a backup mode; and a member mode,
    wherein, when operating in the master mode, the network relay device transmits a first control signal at every predetermined period to another switch device which operates in the backup mode,
    when operating in the backup mode, the network relay device makes a transition to the master mode when not receiving for a predetermined period the first control signal transmitted from another switch device which operates in the master mode, and transmits an initializing signal to other switch devices which operate in the member mode, and
    when operating in the member mode and having received the initializing signal transmitted from another switch device which operates in the master mode, the network relay device constructs a management communication channel with said another other switch device.

7. The network relay device according to claim 6, wherein,
    when operating in the backup mode or the member mode, the network relay device further transmits a second control signal at every predetermined period to another switch device which operates in the master mode, and
    when operating in the master mode, the network relay device further manages respective operation states of other switch devices based on receipt or non-receipt of the second control signal transmitted from said other switch devices.

8. The network relay device according to claim 7, wherein,
    when operating in the master mode, the network relay device further transmits the first control signal at every predetermined period to other switch devices which operate in the member mode, and when operating in the member mode, the network relay device further makes a transition to an initial state before the management communication channel is constructed, when not receiving for a predetermined period the first control signal transmitted from another switch device which operates in the master mode.

9. The network relay device according to claim 7, wherein the management communication channel is constructed of a general port which transmits or receives a data packet of a user based on a standardized communication protocol.

* * * * *